(12) United States Patent
Gyselings et al.

(10) Patent No.: US 7,701,885 B2
(45) Date of Patent: Apr. 20, 2010

(54) POINT-TO-MULTIPOINT TELECOMMUNICATION SYSTEM WITH DOWNSTREAM FRAME STRUCTURE

(75) Inventors: Tim Gyselings, Deurne (BE); Edwin August Philomena Ringoot, CW St. Jansteen (NL); Erwin Alfons Constant Six, Laarne (BE); Dessislava Nikolaeva Nikolova, Leuven (BE)

(73) Assignee: Alcatel, Paris (FR)

( * ) Notice: Subject to any disclaimer, the term of this patent is extended or adjusted under 35 U.S.C. 154(b) by 2105 days.

(21) Appl. No.: 10/436,107

(22) Filed: May 13, 2003

(65) Prior Publication Data
US 2003/0219016 A1 Nov. 27, 2003

(30) Foreign Application Priority Data
May 21, 2002 (EP) .................................. 02291242

(51) Int. Cl.
*H04H 1/00* (2006.01)
(52) U.S. Cl. ................... 370/270; 370/312; 370/390; 370/486
(58) Field of Classification Search ................ 370/390, 370/270, 486
See application file for complete search history.

(56) References Cited

U.S. PATENT DOCUMENTS 5,327,520 A * 7/1994 Chen .......................... 704/219
5,926,478 A * 7/1999 Ghaibeh et al. ........ 370/395.51
5,963,557 A * 10/1999 Eng ............................ 370/432
5,978,374 A 11/1999 Ghaibeh et al.

(Continued)

FOREIGN PATENT DOCUMENTS

EP 0 854 569 A1 7/1998

(Continued)

OTHER PUBLICATIONS

Broadband Optical Access Systems Based on Passive Optical Networks (PON) Amendment 1, ITU-T Recommendation G.983.1 Amendment 1, Nov. 2001.*

(Continued)

*Primary Examiner*—Chi H. Pham
*Assistant Examiner*—Shick Hom
(74) *Attorney, Agent, or Firm*—Sughrue Mion, PLLC

(57) ABSTRACT

A point-to-multipoint telecommunication system can be made more flexible by providing upstream units with generators and locators for generating at least two subsequent overhead cells located next to each other and neighbouring a larger number of data cells for supplying system information. Downstream units are provided with detectors for detecting the subsequent overhead cells. This new signal flame structure allows a larger number of data cells to be exchanged without being interrupted by an overhead cell. Each cell consists of at least 53 bytes in accordance with the Asynchronous Transfer Mode or ATM standard. The at least two overhead cells comprise two overhead cells for supporting 54 data cells, or comprise three overhead cells for supporting 103 data cells. The point-to-multipoint telecommunication systems comprise passive optical networks, with upstream units corresponding to line terminators, and with downstream units corresponding to network terminators.

9 Claims, 2 Drawing Sheets

U.S. PATENT DOCUMENTS

| | | | |
|---|---|---|---|
| 6,434,119 B1 * | 8/2002 | Wiese et al. | 370/252 |
| 6,829,741 B1 * | 12/2004 | Khansari et al. | 714/755 |
| 6,975,649 B1 * | 12/2005 | Roberts et al. | 370/470 |
| 7,006,525 B1 * | 2/2006 | Jha | 370/466 |
| 7,139,487 B2 * | 11/2006 | Kozaki et al. | 398/100 |
| 2002/0021659 A1 * | 2/2002 | Meijen et al. | 370/217 |
| 2004/0246977 A1 * | 12/2004 | Dove et al. | 370/395.61 |
| 2005/0175004 A1 * | 8/2005 | Russell et al. | 370/389 |

FOREIGN PATENT DOCUMENTS

EP     1 056 211 A1     11/2000

OTHER PUBLICATIONS

Ingrid Van de Voorde et al., "Full Service Optical Access Networks: ATM Transport on Passive Optical Networks", *IEEE Communications Magazine*, XP 000693606, Apr. 1997, pp. 70-75.

* cited by examiner

US 7,701,885 B2

POINT-TO-MULTIPOINT TELECOMMUNICATION SYSTEM WITH DOWNSTREAM FRAME STRUCTURE

BACKGROUND OF THE INVENTION

The invention relates to a point-to-multipoint telecommunication system comprising at least one upstream unit and at least two downstream units for sending cells from at least one upstream unit to at least two downstream units, with at least one overhead cell supplying system information and neighbouring at least a first number of data cells.

Such a point-to-multipoint telecommunication system is for example based upon a standardised frame structure like for example G.983.1, in which one overhead cell supplies system information and neighbours 27 following (neighbouring) data cells.

A prior art point-to-multipoint telecommunication system is known from U.S. Pat. No. 5,978,374, which is hereby incorporated by reference and which discloses in its abstract a headend facility (upstream unit) and downstream network units (downstream units) for, as shown in its FIG. 2, downstreaming one framing cell (overhead cell) followed by 89 ATM cells (first number of data cells) and so on.

The known point-to-multipoint telecommunication system is disadvantageous, inter alia, due to being designed for a specific format.

SUMMARY OF THE INVENTION

It is an object of the invention, inter alia, of providing a more allround point-to-multipoint telecommunication system.

The point-to-multipoint telecommunication system according to the invention is characterised in that said upstream unit comprises a generator for generating at least two subsequent overhead cells for supplying system information and neighbouring at least a second number of neighbouring data cells and comprises a locator for locating said at least two subsequent overhead cells next to each other, which second number is larger than said first number, and which downstream units each comprise a detector for detecting said at least two subsequent overhead cells located next to each other.

Said generator and locator and detector allow a new (downstream) signal frame structure to be used which is no longer based upon the known structure of one overhead cell followed by 27 data cells (G.983.1) or by 89 data cells (U.S. Pat. No. 5,978,374). Dependently upon the amount of data to be exchanged without any interruption from the overhead cell, the new (downstream) signal frame structure for example comprises four overhead cells located next to each other and followed by 4×27=108 data cells. Compared to G.983.1, a larger number of data cells can now be exchanged without being interrupted by an overhead cell. This interruption is disadvantageous due to segmentating the large amount of data, which segmentation adds extra overhead, extra delays and delay variations. Compared to U.S. Pat. No. 5,978,374, the two or more overhead cells located next to each other can supply more system information advantageously and importantly than the one overhead cell in U.S. Pat. No. 5,978,374.

The invention is based upon an insight, inter alia, that the known fixed structure of one overhead cell followed by a first number of data cells is non-flexible, and is based upon a basic idea, inter alia, that a new structure with two or more overhead cells located next to each other and followed by a second (larger) number of data cells is advantageously more flexible.

This higher flexibility is more important than the small disadvantage of requiring a little bit more buffer capacity in the downstream units.

The invention solves the problem, inter alia, of providing a more allround point-to-multipoint telecommunication system, and is advantageous, inter alia, in that the number of overhead cells and the following number of data cells can be chosen arbitrarily: in case of a symmetrical system (downstream and upstream each 1244.16 Mbps) there could be four overhead cells followed by 108 data cells, but in case of an asymmetrical system (downstream 1244.16 Mbps, upstream 622.08 Mbps) there could be less like for example three overhead cells followed by for example 108 or 109 data cells, due to each overhead cell comprising granting codes for granting a downstream unit permission to send an upstream message to an upstream unit, with the upstream capacity now being less than the downstrean capacity.

A first embodiment of the point-to-multipoint telecommunication system according to the invention as defined in claim 2 is advantageous in that each cell consists of at least 53 bytes.

Said cell consisting of 53 bytes is in accordance with the Asynchronous Transfer Mode or ATM standard. When consisting of 53+k bytes, said cell is in accordance with possible future standards.

A second embodiment of the point-to-multipoint telecommunication system according to the invention as defined in claim 3 is advantageous in that each overhead cell comprises a header part and a multiple generic part and a further part.

Said overhead cell for example comprises 4 header bytes, one HEC byte, one SYNCx byte, one IDENT byte (together forming the header part), fourteen BLOCK1 bytes, one CRC byte, fourteen BLOCK2 bytes, one CRC byte, fourteen BLOCK3 bytes, one CRC byte (together forming the multiple generic part) and one BIP byte (the further part). So, said multiple generic part for example comprises three generic parts, each comprising for example fourteen BLOCK bytes and one CRC byte. Such a generic part for example comprises so-called grantings for granting a downstream unit access to an upstream or comprises messages for maintenance purposes. Whether a generic part comprises grantings or messages can either be fixed or can be flexible, if flexible, for example the IDENT byte may comprise information about which BLOCK comprises which content. Usually each generic part will have the same size, which is, especially in case of two or more PLOAMs lying next to each other, very advantageous due to each PLOAM then having the same identical structure.

A third embodiment of the point-to-multipoint telecommunication system according to the invention as defined in claim 4 is advantageous in that said at least two overhead cells comprise two overhead cells, with said second number of data cells comprising 54 data cells.

This new structure is advantageous in being a very small but still efficient structure, with said 54 data cells allowing a sufficient amount of data to be transported without interruption from an overhead cell.

A fourth embodiment of the point-to-multipoint telecommunication system according to the invention as defined in claim 5 is advantageous in that said at least two overhead cells comprise three overhead cells, with said second number of data cells comprising 103 data cells.

This new structure is advantageous in being a very efficient structure, due to three overhead cells according to prior art supplying system information for just 81 data cells, which 81 data cells were interrupted each 27 data cells by an overhead cell and which 81 data cells have now been increased to 103 data cells allowing data to be transported without interruption from any overhead cells.

A fifth embodiment of the point-to-multipoint telecommunication system according to the invention as defined in claim 6 is advantageous in that said point-to-multipoint telecommunication system comprises a passive optical network, with said upstream unit corresponding with a line terminator, and with said downstream unit corresponding with a network terminator.

This passive optical network or PON comprises per point-to-multipoint connection one upstream unit corresponding with a line terminator, and many downstream units each corresponding with a network terminator.

The invention further relates to a upstream unit for use in a point-to-multipoint telecommunication system comprising said upstream unit and at least two downstream units for sending cells from at least one upstream unit to at least two downstream units, with at least one overhead cell supplying system information and neighbouring at least a first number of data cells.

The upstream unit according to the invention is characterised in that said upstream unit comprises a generator for generating at least two subsequent overhead cells for supplying system information and neighbouring at least a second number of data cells and comprises a locator for locating said at least two subsequent overhead cells next to each other, which second number is larger than said first number.

Embodiments of the upstream unit according to the invention correspond with the embodiments of the point-to-multipoint telecommunication system according to the invention.

The invention yet further relates to a downstream unit for use in a point-to-multipoint telecommunication system comprising at least one upstream unit and at least two downstream units for sending cells from at least one upstream unit to at least two downstream units, with at least one overhead cell supplying system information and neighbouring at least a first number of data cells.

The downstream unit according to the invention is characterised in that said downstream unit comprises a detector for detecting at least two subsequent overhead cells located next to each other.

Embodiments of the downstream unit according to the invention correspond with the embodiments of the point-to-multipoint telecommunication system according to the invention.

The invention also relates to a method for point-to-multipoint telecommunication and comprising the step of sending cells from at least one upstream unit to at least two downstream units, with at least one overhead cell supplying system information and neighbouring at least a first number of data cells.

The method according to the invention is characterised in that said method comprises the steps of generating at least two subsequent overhead cells for supplying system information and neighbouring at least a second number of data cells and of locating said at least two subsequent overhead cells next to each other, which second number is larger than said first number, and of detecting said at least two subsequent overhead cells located next to each other.

Embodiments of the method according to the invention correspond with the embodiments of the point-to-multipoint telecommunication system according to the invention.

The invention yet also relates to a signal frame structure for point-to-multipoint telecommunication and comprising at least one overhead cell supplying system information and neighbouring at least a first number of data cells.

The signal frame structure according to the invention is characterised in that said signal frame structure comprises at least two subsequent overhead cells for supplying system information and neighbouring at least a second number of data cells, which at least two subsequent overhead cells are located next to each other, which second number is larger than said first number.

Embodiments of the signal frame structure according to the invention correspond with the embodiments of the point-to-multipoint telecommunication system according to the invention.

These and other aspects of the invention will be apparent from and elucidated with reference to the embodiments(s) described hereinafter.

DETAILED DESCRIPTION OF EXEMPLARY EMBODIMENTS OF THE INVENTION

Figure 1:
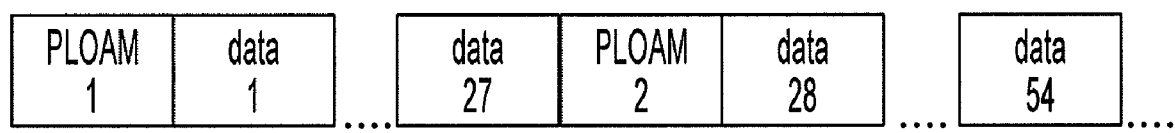
FIG. 1 illustrates in block diagram form a prior art signal frame structure and signal frame structures according to the invention.
Figure 1:
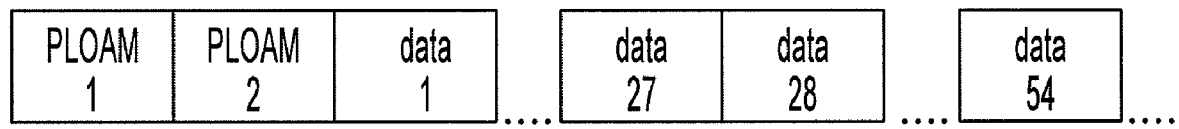
Figure 1:

The three (downstream) signal frame structures shown in FIG. 1 disclose firstly a prior art (downstream) signal frame structure (above) in accordance with G.983.1 comprising one overhead cell (Physical Layer Operation and Maintenance or PLOAM) followed by 27 data cells (first number of data cells). In case of a downstream capacity of 155 Mbps, this frame comprises 56 cells of each 53 bytes. In case of a downstream capacity of 622 Mbps, this frame comprises 4×56 cells of each 53 bytes. Secondly, a (downstream) signal frame structure (middle) in accordance with the invention is disclosed comprising two overhead cells (PLOAM) followed by 54 data cells (second number of data cells). Thirdly, a (downstream) signal frame structure (under) in accordance with the invention is disclosed comprising n overhead cells (PLOAM) followed by m data cells (second number of data cells), with n for example being equal to 3 (or for example 4) and m for example being equal to 103 (or for example 108).

Figure 2:
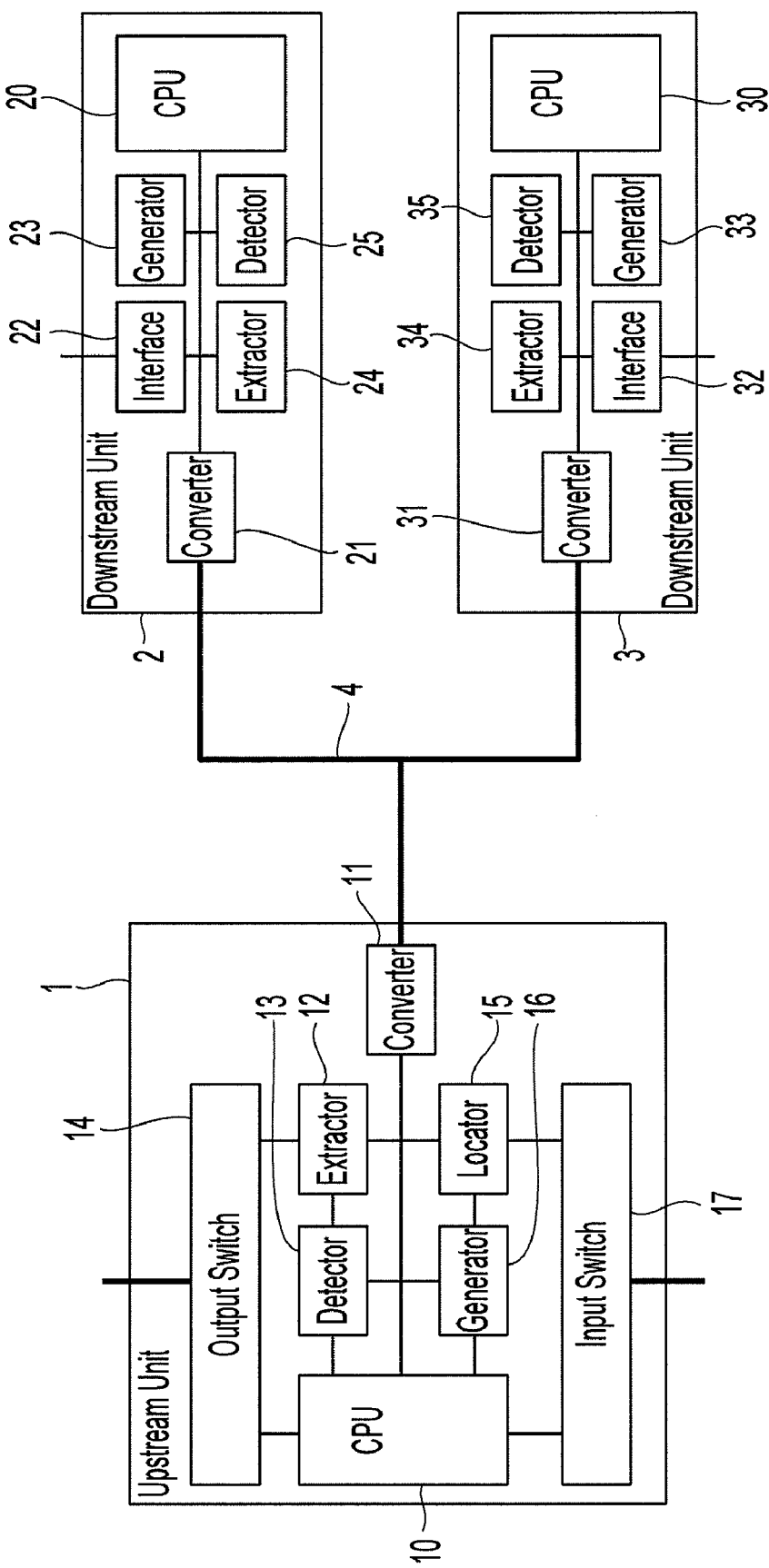
FIG. 2 illustrates in block diagram form a point-to-multipoint telecommunication system according to the invention.

The point-to-multipoint telecommunication system according to the invention shown in FIG. 2 in block diagram form comprises an upstream unit or line terminator 1 coupled via an optical fiber 4 to two downstream units or network terminators 2 and 3.

Line terminator 1 comprises a processor 10 coupled via an internal bus to a convertor 11, which is further coupled to said optical fiber 4. Said internal bus is further coupled to an extractor 12 and to a detector 13 and to a locator 15 and a generator 16. Extractor 12 is further coupled to detector 13 and to an output switch 14, with detector 13 further being coupled to processor 10. Locator 15 is further coupled to generator 16 and to an input switch 17, with generator 16 further being coupled to processor 10.

Network terminator 2 (3) comprises a processor 20 (30) coupled via an internal bus to a convertor 21 (31), which is further coupled to said optical fiber 4. Said internal bus is further coupled to an extractor 24 (34) and to a detector 25 (35) and to an interface 22 (32) and a generator 23 (33). Extractor 24 (34) is further coupled to detector 25 (35), with detector 25 (35) further being coupled to processor 20 (30). Interface 22 (32) is further coupled to generator 23 (33), with generator 23 (33) further being coupled to processor 20 (30).

The point-to-multipoint telecommunication system functions as follows. Data cells arriving at line terminator 1 via input switch 17 and destined for example for one out of sixteen or thirty-two network terminators, with just network terminators 2,3 being shown, are for example converted from optical format into electrical format (or not if already arriving in electrical format) in input switch 17 and supplied to locator 15. At the same time, processor 10 is informed of the arrival, which instructs generator 16 to generate at least two or in general n overhead cells which are supplied to locator 15. Locator 15 combines said n overhead cells and m data cells as shown in FIG. 1 (under) and supplies the combination signal to converter 11, which converts said combination signal from electrical format into optical format and supplies the combination signal to optical fiber 4.

All network terminators 2 (3) coupled to bus 4 receive said combination signal via converter 21 (31) which converts said combination signal from optical format into electrical format and supplies said combination signal to the internal bus. Detector 25 (35) detects the overhead cells (PLOAM level) and informs processor 20 (30), and extractor 24 (34) extracts all data cells (ATM level—by looking at the first five bytes of each 53 byte cell), and the relevant data cell(s) is (are) supplied to interface 22 (32) for being processed by for example a personal computer coupled to said interface 22 (32).

Said overhead cells comprise granting codes for granting a network terminator 2 (3) permission to send an upstream message to a line terminator 1 in a particular upstream time slot. Data for example arriving from said personal computer via interface 22 (32) is converted by interface 22 (32) into an upstream burst and possibly combined with an overhead burst generated by generator 23 (33) into a upstream burst signal which is supplied to converter 21 (31), which converts this upstream burst signal from an electrical format into an optical format and supplies said upstream burst signal to optical fiber 4.

Line terminator 1 receives said upstream burst signal via converter 11 which converts the upstream burst signal from an optical format into an electrical format and supplies said upstream burst signal to the internal bus. Detector 13 detects the upstream burst signal and informs processor 10, and extractor 12 extracts the relevant upstream burst signal, which is supplied to output switch 14 for example for being converted from an electrical format into an optical format (or not if to be forwarded in electrical format) and for example for being forwarded to a further destination.

The point-to-multipoint telecommunication system comprises at least one upstream unit 1 and at least two (usually sixteen or thirty-two) downstream units 2,3 for sending cells from at least one upstream unit 1 to at least two (usually sixteen or thirty-two) downstream units 2,3, with at least one overhead cell (PLOAM) supplying system information and neighbouring at least a first number of data cells (like for example 27 data cells), and is characterised in that said upstream unit 1 comprises a generator 16 for generating at least two subsequent overhead cells (like for example two or three PLOAMs) for supplying system information and neighbouring at least a second number of data cells (like for example 54 data cells or 103 data cells) and comprises a locator 15 for locating said at least two subsequent overhead cells next to each other, which second number is larger than said first number, and which downstream units 2,3 each comprise a detector 25,35 for detecting said at least two subsequent overhead cells located next to each other.

So, instead of one PLOAM followed by 27 data cells, there are now two, three or more subsequent PLOAMs located next to each other (next to each other hereby meaning that there are no data cells between these two, three or more PLOAMs) and these two, three or more PLOAMs, as a whole, supply system information and neighbour the second number of data cells, which second number of data cells comprises at least one data cell more than said first number of data cells, but generally will comprise about twice, three times or more times the first number of data cells. Usually each cell will comprise at least 53 bytes, but exceptions are not to be excluded.

Convertors 11,21,31 and interfaces 22,32 are of common general knowledge to a person skilled in the art. Extractors 12,24,34 and locator 15 for example comprise shift registers coupled to buffers or memories. Detectors 13,25,35 for example comprise comparators receiving comparison values from processors 10,20,30. Generators 16,23,33 for example comprise buffers or memories to be controlled by said processors. Input switch 17 and output switch 14 are switches comprising for example and if necessary said well known converters.

Any block shown in line terminator 1 and network terminators 2,3 respectively can be integrated with processor 10 and processor 20,30 respectively. Usually said converters will however be separate units, which, in case of not using an optical fiber 4 but an electrical bus, could be replaced by bus interfaces. So, the invention is not limited to optical networks, although its main purpose will be directed to said optical networks.

Further, locator 15 and generator 16 could be integrated into one block for generating at least two subsequent overhead cells for supplying system information and for locating said at least two subsequent overhead cells next to each other (without one or more data cells lying in between and with or without any time slots lying in between) and for generating at least a second number of data cells (without one or more overhead cells lying in between and with or without any time slots lying in between) and for neighbouring them (with or without any time slots lying in between) to said at least two subsequent overhead cells (in other words, said one block will create said at least two PLOAM cells, and fill up the remaining cells or second number of cells with data cells if and/or as far as data is available and otherwise with idle information). Extractor 12 and detector 13 could be integrated into one block for said detecting and said extracting. The same holds for interfaces 22,32 and generators 23,33 respectively, and for extractors 24,34 and detectors 25,35 respectively.

The invention claimed is:

1. A point-to-multipoint telecommunication system comprising:
   at least one upstream unit and at least two downstream units for sending cells from the at least one upstream unit to the at least two downstream units with at least one overhead cell supplying system information and neighbouring at least a first number of data cells, wherein the at least one upstream unit comprises a generator for generating at least two subsequent overhead cells for supplying system information and neighbouring at least a second number of data cells and a locator for locating at least two subsequent overhead cells located next to each other, which second number of data cells is larger than the first number of data cells, and wherein the downstream units each comprise a detector for detecting the at least two subsequent overhead cells located next to each other.

2. The point-to-multipoint telecommunication system according to claim 1, wherein each cell comprises at least 53 bytes.

3. The point-to-multipoint telecommunication system according to claim 1, wherein each overhead cell comprises a header part and a multiple generic part and a further part.

4. The point-to-multipoint telecommunication system according to claim 1, wherein the at least two subsequent overhead cells comprise two overhead cells, with the second number of data cells comprising 54 data cells.

5. The point-to-multipoint telecommunication system according to claim 1, wherein the at least two subsequent overhead cells comprise three overhead cells, with the second number of data cells comprising 103 data cells.

6. The point-to-multipoint telecommunication system according to claim 1, wherein the point-to-multipoint telecommunication system comprises a passive optical network, with the upstream unit corresponding to a line terminator, and the downstream unit corresponding to a network terminator.

7. A point-to-multipoint telecommunication system comprising:
  at least one upstream unit and at least two downstream units for sending cells from the at least one upstream unit to the at least two downstream units, with at least one overhead cell supplying system information and neighbouring at least a first number of data cells, wherein the at least one upstream unit comprises a generator for generating at least two subsequent overhead cells for supplying system information and neighbouring at least a second number of data cells, and a locator for locating at least two subsequent overhead cells located next to each other, which second number of data cells is larger than the first number of data cells.

8. A point-to-multipoint telecommunication system, the telecommunication system comprising:
  at least one upstream unit and at least two downstream units for sending cells from the at least one upstream unit to the at least two downstream units, with the upstream unit generating at least one overhead cell supplying system information and neighbouring at least a first number of data cells, and also generating at least two subsequent overhead cells located next to each other for supplying system information and neighboring at least a second number of data cells, wherein each of the at least two downstream units comprise a detector for detecting the at least two subsequent overhead cells located next to each other.

9. A method for point-to-multipoint telecommunication, the method comprising:
  sending cells from at least one upstream unit to at least two downstream units, with at least one overhead cell supplying system information and neighbouring at least a first number of data cells;
  generating at least two subsequent overhead cells for supplying system information and neighbouring at least a second number of data cells,
  locating at least two subsequent overhead cells located next to each other, which second number of data cells is larger than the first number of data cells, and
  detecting the at least two subsequent overhead cells located next to each other.

* * * * *